Patented Mar. 28, 1933

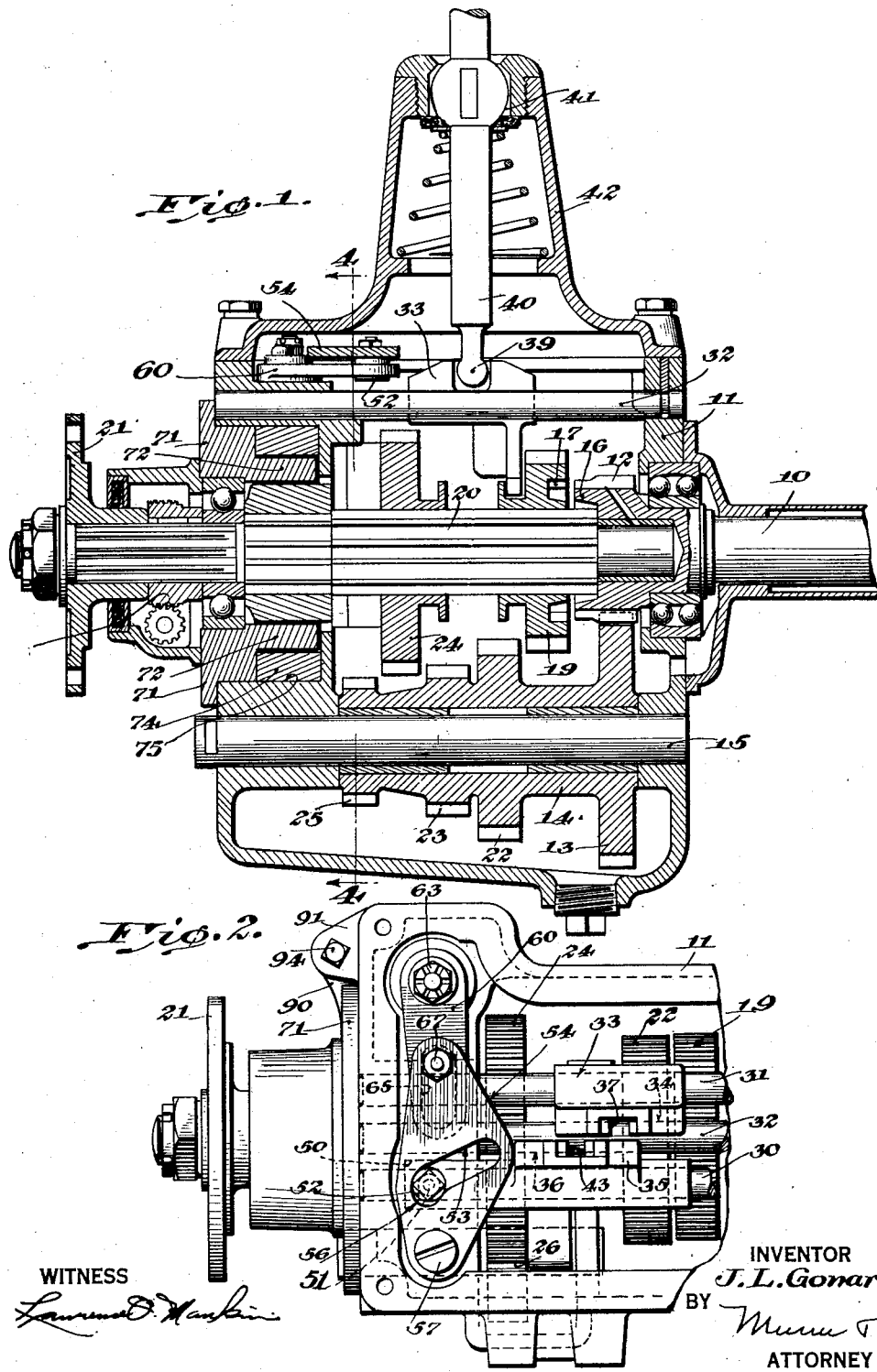

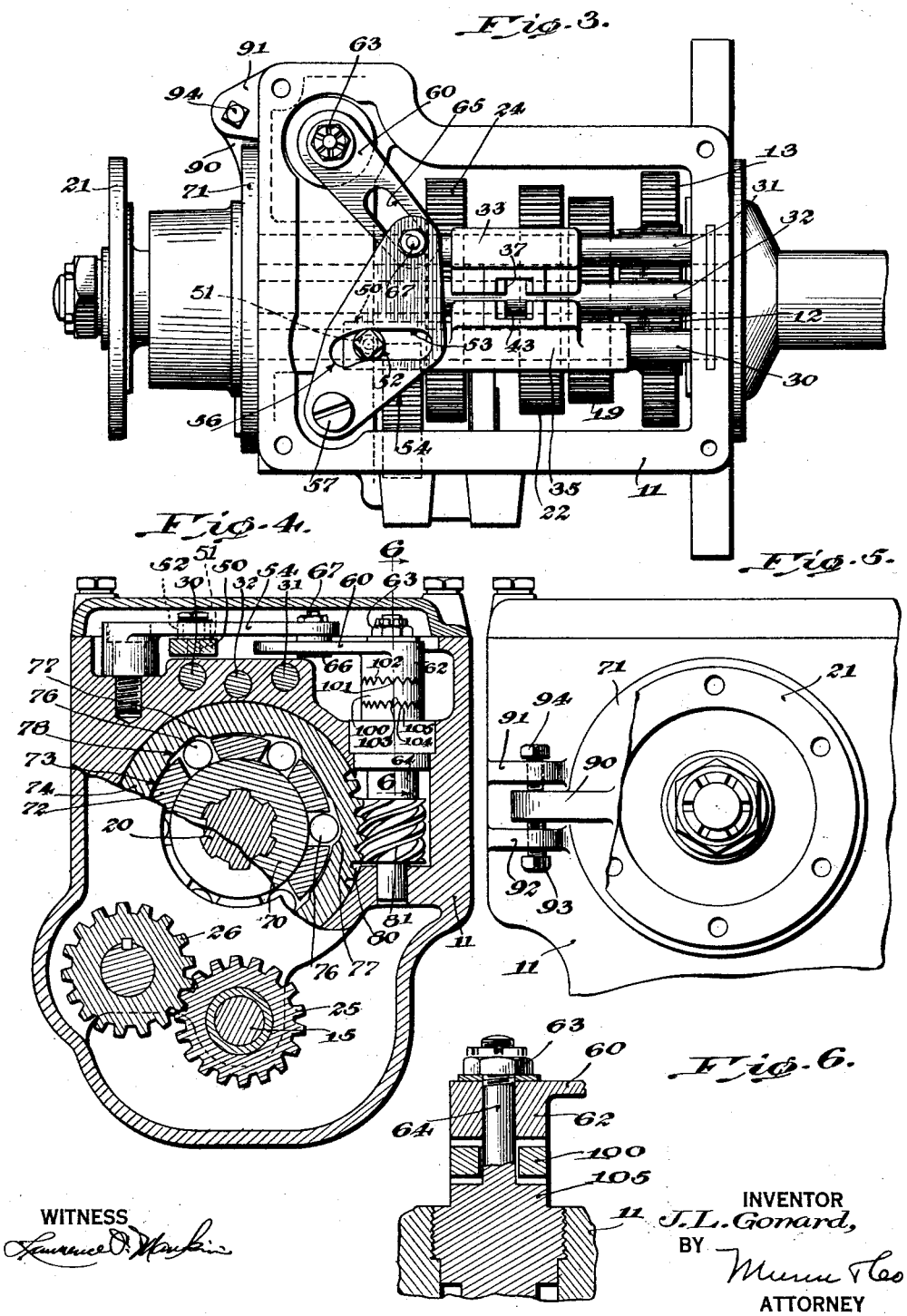

1,903,178

UNITED STATES PATENT OFFICE

JOHN LOUIS GONARD, OF ENGLEWOOD CLIFFS, NEW JERSEY

DEVICE FOR PREVENTING RETROGRADE MOVEMENT OF AN AUTOMOBILE

Application filed October 22, 1931. Serial No. 570,438.

This invention relates to a device for preventing retrograde movement of vehicles, and is an improvement on the device described and claimed in my Patent No. 1,680,148, of August 7, 1928.

An object of the invention is the provision of a device which is incorporated directly in a transmission casing and associated with a gear-shifting element that controls the low speed and reverse speed for maintaining a brake element associated with the driven shaft of the vehicle in an operative position to prevent rotation of a shaft in one direction when the vehicle is on an incline during the neutral or forward positions of the gears of the transmission while releasing the brake element when the shifting element has been moved to reverse position so that the vehicle may be propelled rearwardly under its own power.

A further object of the invention is the provision of a device for preventing retrograde movement of a vehicle when the transmission gears are in neutral or one of the forward positions, a pair of levers being cooperatively connected with one of the levers holding or releasing the brake member, the other lever being connected with the reverse gear-shifting element by a slot and pin connection in such a manner that the last-mentioned lever will be actuated only to operate the brake lever for releasing the brake when the gear-shifting element has been moved to a reverse position.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a longitudinal vertical section of a transmission of a vehicle showing my invention applied thereto, Figure 2 is a top plan view with the cover of the transmission removed showing the gear-shifting element in reverse position, Figure 3 is a plan view similar to Fig. 2 showing the gear-shifting elements in neutral position, Figure 4 is a transverse vertical section taken on the line 4—4 of Fig. 1, Figure 5 is a fragmentary rear view with parts broken away, and Figure 6 is a fragmentary vertical section taken along the line 6—6 of Fig. 4.

Referring more particularly to the drawings, 10 designates a shaft driven by a motor of the vehicle to which it is attached. This shaft extends into a casing 11 and is provided with an external gear 12 which meshes constantly with a gear 13 formed integrally with a sleeve mounted on a shaft 15 carried by the housing 11.

A clutch element 16 on the inner end of the gear 12 engages a clutch element 17 in a gear 19 for causing direct driving between the shaft 10 and a shaft 20. It will be noted that the gear 19 is slidable on the shaft 20 and is splined thereto so that when the gear 19 is driven the shaft 20 will likewise be driven. The shaft 20 extends through the rear end of the housing 11 and is provided with a member 21 for connecting the shaft 20 with the usual drive shaft (not shown) of the vehicle.

The gear 19 is adapted to be shifted inwardly from the clutch element 16 so that it will mesh with a gear 22 also formed integrally with the sleeve 14. Thus it will be seen that when the gear 19 meshes with the gear 22 the second speed of the vehicle will be had.

A gear 23 also formed integrally with the sleeve 14 is adapted to mesh with the gear 24 splined on the shaft 21 when the gear 24 is moved into operative engagement with the gear 23 by the usual shifting element as will be presently explained and thus the low speed of the vehicle will be had.

A gear 25 also formed integrally with the sleeves 14 and driven by the gear 13 normally meshes with an idling gear 26. However, when the gear 24 is moved rearwardly towards the gear 25, it will mesh with the gear 26 so that the shaft 20 will be driven in a direction which will be in reverse from that obtained through the gears 23, 22, or the direct connection between the shafts 10 and 20 through the clutch elements 16 and 17. When the shafts 10 and 20 are thus directly connected a high speed will be had.

Rods 30 and 31 are mounted within the casing 11 in spaced parallel relation and a third rod 32 is also carried by the casing and disposed between the rods 30 and 31 with the axis of the rod 32 being at a lower plane to the axis of the rods 30 and 31. A gear-shifting element 33 is slidably mounted on the rod 31 and has a longitudinally disposed groove 34 in one edge receiving one face of a rod 32. A second gear-shifting element 35 is slidably mounted on the rod 30 and is also provided with a longitudinal groove 36 adapted to receive the opposite face of the rod 32. The gear-shifting element 33 is provided with a notch 37 adapted to receive the toe 39 of a gear-shifting lever 40 which is universally mounted at 41 in an upper extension 42 of the casing 10. The gear-shifting element 35 is also provided with a notch 43 which is adapted to receive the toe 39 of the gear-shifting lever 40.

As is usual in transmissions the gear-shifting elements 33 and 35 are provided with the usual spring-pressed detents for retaining these elements in predetermined positions after they have been shifted to their proper place for controlling the speeds of the vehicle.

The gear shifting element 35 is provided with an extension 50 upon which is mounted a pin 51. A roller 52 is carried by the pin 51 and is received within an elongated slot 53 formed in a lever 54. The slot 53 is in line with the longitudinal movement of the gear-shifting element 35. The slot 53 has a lateral portion 56 in which the roller 52 is located when the gear-shifting element 35 is disposed in position for maintaining the reversing gears in operative relation. The lever 54 is pivotally mounted at 57 on the casing 11.

A lever 60 is provided with a boss 62 at one end which is secured by means of a nut 63 threaded on one end of a shaft 64 mounted in one end of the casing 11. This lever has a slot 65 which receives a roller 66 mounted on a pin 67 which is carried by the free end of the lever 54.

Splined on the shaft 20 is a short sleeve 70 at the rear end of the casing 11. A plate 71 is adjustably mounted on the rear end of the casing 11 and is provided with a plurality of spaced fingers 72 projecting laterally therefrom and extending inwardly of the casing and in embracing relation with the sleeve 70. The inner faces of the fingers 72 are curved to conform to the curvature of the sleeve 70 while their outer faces are curved to conform to the curvature of a ring 74 which is rockably mounted within a recess 75 formed at the rear end of the housing 11. Between the spaced fingers 72 is a plurality of rollers 76 and these rollers rest in pockets formed by the adjacent edges of the fingers 72, the cylindrical surface of the sleeve 70 and the inner periphery of the ring 74.

It will be noted that the outer wall of each pocket which is defined by the inner periphery of the ring 74 has a cut-out portion 77 from which extends an inwardly inclined portion 78 for a purpose which will be presently explained.

A ring 74 is provided with a plurality of spirally arranged teeth 80 which are adapted to mesh with the spirals of a worm 81 formed integrally with the lower end of the shaft 64.

The plate 71 on the rear end of the housing 11 is provided with a radially disposed lug 90 located between a pair of lugs 91 and 92 which are secured to or formed integrally with the housing 11. A set screw 93 is threaded into a passage in the lug 92 and engages one face of the lug 90. A set screw 94 is threaded into a passage in the lug 91 and engages the other face of the lug 90 and maintains the plate 71 in a predetermined position and likewise the fingers 72.

In applying this device to various types of automobiles it will be found that the throw of the shifting element 35 varies so that in some machines a greater distance is required for the shifting of this element while in other machines the shifting element is moved through a less distance. Since it is desired to maintain the pitch of the threads of the worm 81 and the worm gear 80, an adjustment is made for compensating for variations in different transmissions. I have provided a sleeve 100 having a predetermined number of teeth 101 meshing with a similar number of teeth 102 on the lower end of the sleeve 62. The lower end of the sleeve 100 however, is provided with teeth 103 which are of a less number than the teeth 101 and 102. The teeth 103 mesh with teeth 104 formed on the upper end of a sleeve 105 which is fixed against movement in the casing 10. By loosening the nut 63 and rotating the sleeve 100 in one direction or the other, the throw of the lever 60 is either limited or increased. In view of this it is necessary to replace the lever 54 by a longer lever or a shorter lever as the conditions demand. In other words, if the movement of the shifting element is relatively short, the lever 54 will have to be increased in length and the sleeve 100 shifted accordingly. If the movement of the shifting element is greater than normal, the lever 54 must be short and the sleeve 100 moved in the opposite direction until the proper operation of the cooperating levers 54 and 60 is had.

The operation of my device is as follows: When the gear-shifting lever 40 is so moved that the toe 39 engages the notch 37 and is moved back and forth longitudinally of the automobile, the shifting element 33 will be moved in opposite directions to the shifting of the lever and the gears will be so arranged that the second and high speeds of the automobile will be maintained. At this time the rollers 76 forming part of the brake for maintaining the shaft 20 against reverse rotation when the automobile, to which the transmission is attached, is located on an incline with the front end of the machine directed upwardly of the incline, will engage the inclined wall 78 on the ring 74 so that the rollers 76 will be jammed between the sleeve 70 and said inclined walls and prevent reverse rotation of the shaft 20 and thus maintain the automobile against retrograde motion. During the shifting of the lever 40 for high or second speed or neutral speed, the roller 52 will be located in the longitudinal portion of the sleeve 53 so that the lever 54 will not be actuated for operating the lever 60.

When the shifter rod has been rocked so that the toe 39 will engage the notch 43 and the shifter element 35 has been moved rearwardly of the transmission casing 11, the gears will be meshed for low speed and the roller 52 will still be riding in the longitudinal portion of the slot 53 and the roller 32 will likewise be in the longitudinal portion of the slot during the neutral position.

When, however, the shifter element 35 has been moved to a position where the gear 24 meshes with the idler gear 26, for causing a reverse speed of the vehicle, the roller 52 will be moved into the laterally disposed portion 56 of the slot 53, thereby causing the lever 54 to be rocked and likewise the lever 60. When this occurs, the ring 74 will be rocked until the cut-out portions 77 of the walls of the pockets containing the roller 76 alines with said rollers so that said rollers will not be clamped between the sleeves 70 and the inner periphery of the ring 74. The automobile at this time may be reversed under its own power or may be permitted to roll backwardly down a hill.

At any position of the gear-shifting elements other than the reverse position, the inclined portions 78 of the outer wall of the pockets housing the roller 76 will be in a position to jam the rollers against the sleeve 70 and prevent reverse rotation of the shaft 20.

It may be desirable to adjust the position of the fingers 72 in order to retain the rollers 76 in proper position that they will engage the inclined portions 78 of the pockets. When this is desired the set screws 93 and 94 may be adjusted to rock the plate 71 and when the set screws are drawn up tight the lug 90 will maintain the plate in the adjusted position. It is only necessary to adjust the position of the plate 71 when it is found that a clutch member does not retain the shaft 20 against reverse rotation and likewise the retrograde motion of the vehicle.

I claim:

1. In a transmission mechanism for power driven vehicles, means associated with the transmission mechanism for preventing retrograde movement of the vehicle during neutral and forward speeds and comprising a driven shaft, a one-way brake element on the shaft, a lever for releasing the brake, a gear shifting element in the transmission for controlling the low and reverse speed provided with a pin, a lever pivotally mounted at one end, means connecting the free ends of the levers together, the second lever being provided with a slot intermediate the ends thereof and having a straight portion in line with the movement of the shifting element, receiving the pin during neutral and forward speeds, and retaining the brake lever against movement, one end of the slot being extended laterally to receive the pin when the shifting element is moved to reverse position for rocking both levers to release said brake to permit retrograde movement of the vehicle.

2. In a transmission mechanism for power driven vehicles, means associated with the transmission mechanism for preventing retrograde movement of the vehicle during neutral and forward speeds and comprising a driven shaft, a one-way brake element on the shaft, a lever for normally retaining the brake in operative relation with the shaft, a gear-shifting element in the transmission for controlling the low and reverse speed, a lever pivotally mounted at one end, means connecting the free ends of the levers together, co-operating means on the second lever and the gear-shifting element for causing rocking of both levers and release of the brake when the gear-shifting element has been moved to reverse position but maintaining the brake lever in an operative position when the gear-shifting element has been moved to a neutral or a low speed position.

3. In a transmission mechanism for power driven vehicles, means associated with the transmission mechanism for preventing retrograde movement of the vehicle during neutral and forward speeds and comprising a driven shaft, a one-way brake element on the shaft, a lever for releasing the brake, a gear-shifting element in the transmission for controlling the low and reverse speed and having an extension provided with a pin, a lever pivotally mounted at one end, the brake lever having an elongated slot, a roller carried by the free end of the second lever and disposed within the slot, the second lever being provided with a slot intermediate the ends thereof having a straight portion in line with the movement of the shifting element, receiving the pin during neutral and forward speeds and retaining the brake lever against movement, one end of the slot being extended laterally to receive the pin when the shifting element is moved to reverse position for rocking the levers to release said brake to permit retrograde movement of the vehicle.

4. In a transmission for power driven vehicles, a casing, a transmission in the casing, a shaft driven by the said transmission and forming an element of a power drive for the vehicle, a gear-shifting element for controlling neutral, low, and reverse positions of the respective speed gears, a braking means embracing the shaft and co-operating with the casing for preventing rotation of the shaft in one direction during neutral and forward speeds, a lever, means connecting the lever with the braking means, means actuated by the gear-shifting element when moved to reverse position for actuating the lever and releasing the braking means, the braking means including a pair of braking elements co-operatively associated with means for maintaining the braking elements in operative relation, and means for adjusting the last-mentioned means for varying the position of one of the braking elements relative to the other.

5. In a transmission for power driven vehicles, a casing, a transmission in the casing, a shaft driven by said transmission for forming an element of a power drive for the vehicle, a gear-shifting element for controlling neutral, low, and reverse positions of the respective speed gears, a brake element embracing the shaft and co-operating with the casing for preventing rotation of the shaft in one direction during neutral and forward speeds, a lever, means connecting the lever with the brake element, means actuated by the gear-shifting element when moved to reverse position for actuating the lever and releasing the brake element, the connecting means between the lever and brake including an adjustable sleeve having a greater number of teeth on one end than on the other end, the lever having teeth corresponding in number to the teeth on one end of the sleeve and meshing with said teeth, a plurality of fixed teeth corresponding in number to the number of teeth on the other end of the sleeve and meshing with said teeth.

6. A transmission mechanism comprising a driving shaft, a driven shaft, gearing connecting the driven shaft with the driving shaft, shifting means providing for various combinations of the gearing for causing differential speeds of the shaft in one direction, a neutral speed, and a reverse speed of the driven shaft, a pin connected with said means, a one-way brake element on the shaft, a lever for releasing the brake element, a lever pivotally mounted at one end, means connecting the free ends of the levers together, the second lever being provided with a slot intermediate the ends thereof and having a straight portion in line with the movement of the shifting means receiving the pin during the neutral and several differential speeds of the driven shaft and retaining the brake release lever against movement, one end of the slot being extended laterally to receive the pin when the shifting means is moved to cause reverse rotation of the shaft for rocking both levers to release said brake element.

7. In a transmission mechanism for power driven vehicles, means associated with the transmission mechanism for preventing retrograde movement of the vehicle during neutral and forward speeds and comprising a driven shaft, a one-way brake element on the shaft, a transmission housing having an open end, the one-way brake element being insertable into the open end of the housing as a unit and closing the end of the housing, a lever for releasing the brake, a gear shifting element in the transmission for controlling the low and reverse speed provided with a pin, a lever pivotally mounted at one end, means connecting the free ends of the levers together, the second lever being provided with a slot intermediate the ends thereof and having a straight portion in line with the movement of the shifting element, receiving the pin during neutral and forward speeds, and retaining the brake lever against movement, one end of the slot being extended laterally to receive the pin when the shifting element is moved to reverse position for rocking both levers to release said brake to permit retrograde movement of the vehicle.

JOHN LOUIS GONARD.